United States Patent
Mocciolo et al.

(10) Patent No.: US 9,171,332 B2
(45) Date of Patent: Oct. 27, 2015

(54) EQUITY/INTEREST RATE HYBRID RISK MITIGATION SYSTEM AND METHOD

(75) Inventors: Nicholas Mocciolo, Ellington, CT (US); Peter P. Perrotti, Avon, CT (US)

(73) Assignee: HARTFORD FIRE INSURANCE COMPANY, Hartford, CT (US)

(*) Notice: Subject to any disclaimer, the term of this patent is extended or adjusted under 35 U.S.C. 154(b) by 905 days.

(21) Appl. No.: 12/002,376

(22) Filed: Dec. 17, 2007

(65) Prior Publication Data
US 2009/0198522 A1 Aug. 6, 2009

Related U.S. Application Data

(60) Provisional application No. 60/962,196, filed on Jul. 27, 2007.

(51) Int. Cl.
G06Q 40/00 (2012.01)
G06Q 40/04 (2012.01)
G06Q 40/08 (2012.01)

(52) U.S. Cl.
CPC .............. *G06Q 40/04* (2013.01); *G06Q 40/08* (2013.01)

(58) Field of Classification Search
CPC ..................................... G06Q 40/08
USPC .......................................... 705/4
See application file for complete search history.

(56) References Cited

U.S. PATENT DOCUMENTS

| | | | |
|---|---|---|---|
| 6,405,179 B1* | 6/2002 | Rebane | 705/36 R |
| 2002/0120542 A1 | 8/2002 | Higgins | |
| 2003/0093354 A1 | 5/2003 | Marshall | |
| 2004/0030624 A1* | 2/2004 | Nishimaki | 705/35 |
| 2004/0138983 A1* | 7/2004 | Nishimaki | 705/36 |
| 2004/0177022 A1* | 9/2004 | Williams et al. | 705/36 |
| 2004/0199459 A1 | 10/2004 | Johnston et al. | |
| 2005/0086149 A1 | 4/2005 | Efron et al. | |
| 2005/0086152 A1* | 4/2005 | Sweeting | 705/37 |
| 2005/0262015 A1* | 11/2005 | Kownacki et al. | 705/38 |
| 2006/0122871 A1* | 6/2006 | Cowley et al. | 705/4 |
| 2006/0206398 A1* | 9/2006 | Coughlin | 705/35 |
| 2006/0212380 A1* | 9/2006 | Williams et al. | 705/35 |
| 2006/0242052 A1* | 10/2006 | Long et al. | 705/35 |
| 2006/0271452 A1 | 11/2006 | Sparaggis | |
| 2007/0136164 A1* | 6/2007 | Roti et al. | 705/35 |

(Continued)

OTHER PUBLICATIONS

Moshe Arye Milevsky and Steven E. Posner, The Titanic Option: Valuation of the Guaranteed Minimum Death Benefit in Variable Annuities and Mutual unds. Journal of Risk and Insurance, vol. 68, Mar. 2001, pp. 93-128.*

(Continued)

*Primary Examiner* — Stephanie M Ziegle
(74) *Attorney, Agent, or Firm* — Howard IP Law Group, PC

(57) ABSTRACT

The present invention provides a method and system for determining hedging transactions to meet required characteristics of risks associated with an insurance instrument, and mitigating the risks associated with the insurance instrument by executing hedging transactions. The hedging transactions utilize hybrid derivatives. In general, the equity/interest rate hybrid derivative concept encapsulates any derivative, or any investment vehicle with an embedded derivative, that contains a payoff formula(s). At a minimum the formula(s), is/are a function of two items: equities, and any interest rates.

27 Claims, 6 Drawing Sheets

(56) References Cited

U.S. PATENT DOCUMENTS

2007/0162365 A1* 7/2007 Weinreb .................... 705/35
2009/0138410 A1* 5/2009 Mocciolo ................ 705/36 R

OTHER PUBLICATIONS

David Blake, Does it Matter What type of Pension Scheme You Have?, The Economic Journal, vol. 110 No. 461, Feb. 2000, pp. F46-F81.*

No Author, Record vol. 30, No. 2, SPring Meeting, San Antonio TX—Session 31PD Hedging Variable Annuity Guarantees: A Practical Discussion, Jun. 14-15, 2004, Society of Actuaries, pp. 1-22.*

Mallier, R et al. Pricing Equity—Linked Debt Using the Vasicek Model. Acta Math. Univ. Comenianae vol. LXXI, 2(2002), pp. 211-220. http://www.emis.de/journals/AMUC/_vol-71/_no_2/_alobaidi/alobaidi.pdf.*

Raymond, Craig. The Hartford Financial Services Group Smith Barney Annuity and Life Risk Management Seminar. Jun. 7, 2005. http://www.thehartford.com/higfiles/pdf/HIGSmithBarneyAnnuityLifeRisk060705.pdf.*

Sjoreen, Jim et al. Variable Annuity Risk Managment Workshop. Lincoln Financial Group. Nov. 10, 2006. https://www.ermonline.net/lfg/DOCS/pdf/webcast/Workshop.pdf.*

Liu, Winter. Hedging at Your Insurance Company. SEAC Spring 2007 Meeting. Jun. 2007. http://www.seactuary.com/files/handouts/Hedge_Your_Insurance_Company-Liu.pdf.*

Ptel, Navroz. Life's Perilous Journey. Risk Magazine. Mar. 1, 2006. http://www.risk.net/risk-magazine/feature/1497608/life-perilous-journey.*

Ho, Thomas et al. Managing the Risk of Variable Annuities: a Decomposition Methodology. Feb. 15, 2005. http://www.thomasho.com/papers/VA%20JOIM%20Final3.pdf.*

Ho, Thomas et al. Practical Considerations in Managing Variable Annuities. Oct. 2005. http://www.thomasho.com/papers/VALPS_finalized.pdf.*

Di Graziano, Giuseppe et al. Hybrid Derivatives Pricing under the Potential Approach. May 4, 2006. http://www.statslab.cam.ac.uk/~chris/papers/PotentialHybrid3.pdf.*

Dodgson, Matthew et al. Inflation-Linked Derivatives. Risk Training Course Royal Bank oif Scotland Group. Sep. 8, 2006. http://www.quarchome.org/inflation/inflationlinkedderivatives20060908.pdf.*

Edward A. Mirsepahi, "Hedging Variable Annuities in the Capital Markets: A Dealer's Perspective", The Actuary Magazine—Apr./May 2005, URL: http://www.soa.org/library/newsletters/the-actuary-magazine/2005/april/hed2005april.aspx, 5pgs.

The Society of Actuaries and Annuity Systems Inc. Presents: "First Annual Equity based Insurance Guarantees Conference Book", Oct. 6-7, 2005, The Westin New York Times Square, New York, NY, (cover + 1pg. + table of contents 1pg. + Introduction 2pgs. + Corporate Sponsors 1pg. + Presenter Biographies 7pgs. + Slide Presentation + 278pgs, total 290 pages).

"Second Annual Equity-Based Guarantees Conference Book", Oct. 5-6, 2006, Chicago, IL, Society of Actuaries, Annuity Systems Inc., (cover 1pg. + Corporate Sponsors 2pgs. + Attendee List 6pgs. + Chairman Biography 1pg. + Speakers Biographies 4pgs. + Slide Presentation + 238pgs, total 248 pages).

"PCT International Search Report", dated Oct. 10, 2008 for PCT/US08/08195, 2pgs.

* cited by examiner

EQUITY/INTEREST RATE HYBRID RISK MITIGATION SYSTEM AND METHOD

FIELD OF THE INVENTION

The present invention generally relates to the field of hedging. More specifically, the present invention discloses a novel method and system of hedging the risks involved in providing variable annuities.

BACKGROUND OF THE INVENTION

Often, individuals will seek to guarantee a steady stream of income for situations when their regular income is either diminished or altogether unavailable (e.g. retirement, times of financial hardship, etc). Additionally, individuals may make an investment in order to expand their income at a later date. In such cases, these individuals will often invest their existing funds, in order to guarantee a stream of payments of the invested amount, as well as to receive return from the investment at a later time. This type of investment is generally known as an "annuity." An individual investing in an annuity (and upon whose life the income payments will be based) is known as an "annuitant." The individual receiving payments from the annuity is known as the "contract owner." The contract owner and the annuitant are often the same individual.

The annuity has two phases: an accumulation phase, during which the contract builds a cash value and money is added, and a payout phase, during which the funds are distributed. An annuitant may choose to purchase an annuity with a lump sum, or may make continuous payments into an annuity fund. Regardless of the payment method chosen by the annuitant, the financial or insurance institution offering an annuity will begin making periodic payments to and stop receiving funds from the annuitant on a predetermined date, this is known as "annuitization."

Two common types of annuities are known as fixed annuities ("FA") and variable annuities ("VA"). Upon annuitization, fixed annuities offer payments of predetermined value, or of sums that increase by a set percentage. Conversely, upon annuitization, variable annuities offer payments determined by the performance of a particular investment option (e.g. bonds).

With a variable annuity, the annuity contract owner bears the investment risk. The relevant life typically has a choice of investment options in which he/she can direct where the annuity deposits will be invested. These various investment options, or sub-accounts, may include stocks, bonds, money market instruments, mutual funds and the like.

Since the yield of a variable annuity is dependent on the specific sub-accounts, the risk involved in purchasing a variable annuity is proportional to the risk involved in investing in the underlying sub-accounts. While a potential annuitant may be interested in a specific investment option, the risk involved over a long period of time before annuitization may be unappealing. In such a case, the financial institution or insurance company offering the variable annuity product may elect to guarantee a certain minimum return on the annuitant's investment. Thus, the financial or insurance institution would assume some of the risk involved in purchasing a variable annuity product.

Variable annuity contracts can also provide a death benefit. Usually, during the accumulation period, this death benefit is related to the value of the underlying sub-accounts, or contract value. That is, if the sub-accounts backing the contract value have performed poorly, then the death benefit may be reduced to an insignificant amount. After annuitization, the death benefit can be a function of the remaining payments of the annuity at the time of the relevant life's death.

Annuity contracts may also provide guarantees in several different variations. A guaranteed minimum death benefit ("GMDB") is a guarantee that provides a minimum benefit at the death of the relevant life regardless of the performance of the underlying investments. A guaranteed minimum income benefit ("GMIB") is a guarantee that will provide a specified minimum income amount at the time the contract is annuitized. The income payment will be dependent on previously stated details set out in the contract.

A guaranteed minimum accumulation benefit ("GMAB") is a benefit that guarantees a specified minimum contract value at a certain date in the future, even if actual investment performance of the contract is less than the guaranteed amount. A guaranteed minimum withdrawal benefit ("GMWB") is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider (as described below). Further, if the annuity contract does not provide a guarantee (e.g. GMIB, GMWB, etc.), the contract will terminate when the contract value goes to $0 or some other amount specified in the contract.

The guarantees form a class of liabilities collectively referred to as variable annuity guaranteed benefits ("VAGB"). These guarantees are known as "riders." The contract holder can purchase riders in order to guarantee a certain minimum performance criteria for underlying separate accounts. To the extent that the underlying investments do not perform in such a way so that the minimum criteria are met, the writing insurance company must subsidize the difference between the minimum performance that the VAGB guarantees and the actual performance of the underlying sub-accounts.

VAGBs can be further subdivided into several different categories, which are shown in FIG. 1. Two common categories of VAGBs 104 are variable annuity guaranteed minimum death benefits ("VAGMDB") 106 and variable annuity guaranteed living benefits ("VAGLB") 108.

The VAGMDB 106 is commonly implemented as one the following three (3) manifestations: return of premium death benefits ("ROPDB") 110, high watermark and/or periodic ratchet death benefits ("HWDB/PRDB") 112, and earnings enhancement death benefits ("EEDB") 114.

The VAGLB 108 is commonly implemented as one the following three (3) manifestations: variable annuity guaranteed minimum accumulation benefits ("GMAB") 116, variable annuity guaranteed minimum income benefits ("GMIB") 118, and variable annuity guaranteed minimum withdrawal benefits ("GMWB") 120. This is not intended as an exhaustive list, but rather, a broad overview of the general trend of VAGBs currently available.

As previously discussed, two types of VAGBs are VAGMDB and VAGLB. The fundamental difference between VAGMDBs and VAGLBs is that the former requires that the annuitant die in order for the contract holder to realize the incremental value afforded by the guarantee. On the contrary, VAGLBs permit the contract holder to realize some or all of the benefit of the guarantee while the annuitant is living.

Naturally, regardless of the specific form taken by a particular VAGB, there is significant risk that the underlying sub-accounts perform in a manner that is inadequate to meet the minimum performance criteria. Financial and insurance institutions offering VAs are often interested in decreasing the risks entailed in the sale of a variable annuity.

Historically, many financial and insurance institutions have purchased reinsurance in an attempt to share the risk that there will be inadequate funds available to cover these guarantees. Typically, reinsurance companies spread risks by pooling the risks of multiple companies and contracts. Specifically, insurance companies pay a premium to cede a portion of their risk so that if losses are above a negotiated amount, the reinsurance company will reimburse the insurance company for these excess losses. Since the reinsurance company assumes risks from multiple companies, any losses incurred from business assumed from one insurance company are expected to be outweighed by profits from another company, thus allowing the reinsurance company to make a profit. Over the years, most reinsurers have withdrawn from providing coverage for variable annuity contracts having features such as those described above because of the high correlation among the contracts, and thus the risk could not be mitigated by pooling risks from multiple companies. Because of the inability of insurance companies to reinsure variable annuity contracts, they incurred large economic losses during the stock market decline from 2000 to 2002.

Another method of mitigating these risks is known as a "hedge," while investing in a hedge is known as "hedging." To protect the variable annuity contract holders, and to ensure the claims-paying ability of the writing insurance company, hedging programs are often maintained by insurance carriers to offset the risk associated with the riders.

Hedging is a strategy that entails making an investment, the gains of which will offset the losses of a business risk, thus allowing the hedging entity to benefit from a gain involved in a particular business transaction while offsetting losses. Commonly, hedging is used to diminish the risk factors involved in a specific investment, but can also be used to manage the risks involved in guaranteeing a minimum income to an annuitant on a variable annuity, or for a group of annuitants whose variable annuities depend on the same or similar factors.

Various strategies are being employed to manage GMWB and GMDB risks: (a) delta hedging (uncertain effectiveness since a GMWB's exposure to "vega" (implied volatility) is not hedgeable with futures, and substantial EPS (earnings per share) and economic risks remain); (b) Multi-greek hedging with futures and vanilla options (reasonably effective to hedge economic and EPS exposure over intermediate term and stable markets, but long term effectiveness is uncertain due to cost and exposure to second and third order risks); and (c) Multi-greek hedging with futures, vanilla options, and exotic equity options (reasonably effective to hedge EPS exposure over intermediate term and stable markets, but long term effectiveness is not well understood).

Hedging programs can vary significantly but generally proceed according to the following pseudo-algorithm:
Construction of a mathematical valuation model to compute an estimate of the value of the written guarantee liability, conditional upon a set of relevant capital markets data and assumptions for annuitant behavior.
Gathering required capital markets data, dependent upon the structure of the guarantee and the contractually permissible set of investment options, but generally including:
The spot price of relevant equity indices.
The term structure of interest rates denominated in all of the currencies that are reflected in the valuation model.
The spot price of relevant cross-currency exchange rates associated with all of the currency pairs that are reflected in the valuation model.
The forward implied dividend curves for each of the relevant equity indices.
A sub-model for the volatility associated with the price of the equity indices.
A sub-model for the volatility associated with the relevant cross-currency exchange rates.
A sub-model for the volatility associated with the interest rates of all relevant term structure.
Formulating assumptions of annuitant behavior, dependent upon the structure of the guarantee, but generally including:
Assumed rates of mortality for individual annuitants, or a sub-model for stochastic mortality.
Assumed rates of lapsation for individual annuitants and/or a predefined algorithm (deterministic or stochastic) for future lapsation rates that is a function of other variables in the valuation (so-called "dynamic lapsation").
Assumed rates of utilization for behavioral choices granted to the contract holder under the terms of the guarantee, such as size and frequency of periodic withdrawal of funds from the variable annuity contract and/or a predefined algorithm (deterministic or stochastic) for future utilization that is a function of other variables in the valuation ("dynamic utilization").
Size, style and frequency of transfer of funds between investment options and/or a predefined algorithm (deterministic or stochastic) for future transfers that is a function of other variables in the valuation.
Defining a series of sets of unexpected fluctuations ("shocks") to be applied to capital markets data.
Running the valuation model and computing an estimate of the valuation of the written liability under the "base case" market data and under each set of shocks. This information can be used to determine an estimate of the base valuation of the written liability and of the sensitivities of the valuation estimate to changes in specific capital markets data. (The estimate of the base valuation of the written liability and the estimate of the sensitivities of the valuation estimate to changes in specific capital markets data are known in the art as "Greeks").
Formulating a hedge portfolio and executing an analogous valuation/sensitivity exercise to calculate the base valuation and the Greeks.
Executing trades in the hedge portfolio that position the aggregated Greeks of the hedge portfolio to be within desired ranges relative to the liability Greeks.
Several useful notations are defined as follows:
$f_L^B$ is the liability valuation under the base case set of capital markets assumptions
$\delta_L$ is the liability delta
$\kappa_L$ is the liability vega
$\rho_L$ is the liability rho
Furthermore, it should be noted that the liability delta is defined as the sensitivity of the VAGB valuation to instantaneous changes in stock or stock index levels, the liability vega is defined as the sensitivity of the VAGB valuation to instantaneous changes in stock or stock index implied volatility levels, and the liability rho is defined as the sensitivity of the VAGB valuation to instantaneous changes in interest rates.

Additionally, there are innumerable other Greeks that can be defined and managed as part of a hedge program. Those may include the following additional metrics:
deltas with respect to foreign currency exchange rates,
"partial" or "bucket" vegas which are sensitivities of the VAGB valuation to implied volatilities of a specific tenor rather than to the implied volatility surface as a whole, "partial" or "key rate" rhos which are sensitivities of the VAGB valuation to interest rates of a specific tenor rather than to the entire yield curve in parallel, "correlation vegas" which are the sensitivities of the VAGB valuation to changes in the level of correlation between set of capital markets variables assumed to be stochastic, "theta," which is the sensitivity of the VAGB valuation to the passage of time, any number of higher-order sensitivities, and any number of cross-gammas.

Finally, it should be noted that the above is by no means meant to be an exhaustive list of all possible Greeks, but merely an illustrative description of some Greeks that may be instrumental in understanding the subject matter of the invention.

The following is an example of hedging the liability associated with a VA. Assuming a VA guarantee has been written on a VA contract in which the policyholder's funds are invested in a single asset, and supposing the writing insurance company wishes to implement a 3-Greek first order hedge to offset delta, vega, and rho risk. Let $f_L(x,y,z)$ be the liability valuation estimate computed after a hypothetical change to the underlying stock index of x, a hypothetical change to the underlying index volatility of y, and a hypothetical change to the underlying interest rate term structure of z.

In classic terminology, the three Greeks of the liability would be computed using a finite-differencing methodology as follows:

$$f_L^B = f(0,0,0)$$

$$\delta_L = f_L(1,0,0) - f_L(0,0,0) = f_L(1,0,0) - f_L^B$$

$$\kappa_L = f_L(0,0.01,0) - f_L(0,0,0) = f_L(0,0.01,0) - f_L^B$$

$$\rho_L = f_L(0,0,0.0001) - f_L(0,0,0) = f_L(0,0,0.0001) - f_L^B$$

Similar metrics can be calculated for a portfolio of hedging assets. Using analogous notation, a standard goal of a hedging program would be to formulate a portfolio of hedging assets that, minimally, meets the following criteria:

- $|\delta_A - \delta_L| < \varepsilon_\delta$ and/or $\varepsilon_{\delta,1} < \frac{\delta_A}{\delta_L} < \varepsilon_{\delta,2}$
- $|\kappa_A - \kappa_L| < \varepsilon_\kappa$ and/or $\varepsilon_{\kappa,1} < \frac{\kappa_A}{\kappa_L} < \varepsilon_{\kappa,2}$
- $|\rho_A - \rho_L| < \varepsilon_\rho$ and/or $\varepsilon_{\rho,1} < \frac{\rho_A}{\rho_L} < \varepsilon_{\rho,2}$ Wherein, the $\epsilon$ ("epsilon") represents tolerance imposed on the management of the portfolio. Notably, they need not be constant, although they are expressed that way above. The above examples demonstrate first-order hedging only in a 3-Greek framework, but similar exercises can and are performed related to higher-order Greeks and cross-gammas. That is, second-order Greeks and cross-gammas can be calculated using analogous finite differencing methodologies and analogous hedge tolerances can be defined. Furthermore, each of the above three equations represents the hedging of a different Greek (i.e. delta, vega, and rho). Additionally, the main difference between the first and second condition, in each of the above three equations, is whether the deviation in liability and asset Greeks is viewed on an absolute and/or a relative basis.

The motivation for Greek-matching is to produce gains or losses that offset losses or gains made on the liability. For example, suppose that the price of the underlying asset were to decrease by one. This would result in a change (generally a loss in the case of VA guarantees) of $\delta_L$. However, due to the construction of the asset portfolio, the hedges will experience a change in value (generally a gain in the case of VA guarantee hedges) of $\delta_A$. Since the hedging process ensures that the difference between $\delta_A$ and $\delta_L$ is small, the net economic impact on the company is also small, making the company reasonably indifferent to small changes in these capital market variables.

Among other factors, hedging effectiveness on VA guarantees using generic hedging instruments, known as "vanilla hedging instruments," is dependent upon the size, frequency and correlation of movements in critical capital markets variables. Generally, small changes in valuation inputs will not cause a hedge to materially lose effectiveness. Depending upon the nature of the guarantee written, as well as upon the exact instruments chosen for hedging, there are two characteristics of VA guarantee liabilities that cause hedging ineffectiveness in existing systems for guaranteeing benefits using hedging: 1) the instance where valuation inputs experience large and/or sudden changes, and 2) when several of the inputs move together.

SUMMARY OF THE INVENTION

The present invention comprises a method and system for mitigating risks associated with an insurance instrument. The method includes the steps of determining hedging transactions to meet required characteristics of risks associated with the insurance instrument, and mitigating the risks associated with the insurance instrument by executing hedging transactions. The hedging transactions utilize hybrid derivatives. In general, the equity/interest rate hybrid derivative concept encapsulates any derivative, or any investment vehicle with an embedded derivative, that contains a payoff formula(s). At a minimum the formula(s), is/are a function of the performance of the following two items jointly, except traditional call and put options on a basket of mixed underlyings:

1. Any single or packaged combination of individual equities, equity indices, exchange-traded funds, equity futures, and/or equity forwards, and
2. Any single interest rate, combination of interest rates, or observation(s) of the joint behavior of one or more interest rates, or one or more indices linked to interest rates, or any single fixed income instrument or combination of fixed income instruments, or any single fixed income index or combination of fixed income indices, or any combination of any two or more of the items listed above. This is irrespective of issuer, currency of denomination, representative tenor, compounding style and/or frequency.

The insurance contract provides a guaranteed minimum death benefit, a guaranteed minimum income benefit, a guaranteed minimum accumulation benefit and a guaranteed minimum withdrawal benefit.

The insurance instrument may be an annuity contract, a variable annuity contract, or a fixed annuity contract.

An account value of the insurance instrument is determined and the account value is at least in part based on account features of the insurance instrument, or the demographics of a policyholder.

The account features comprise one or more of the following: a product type, a death benefit, a withdrawal amount, a lapse period, a ratchet value, a fund selection, and a rollup value. The demographics of a policyholder of the insurance instrument includes at least one of the following: an age, a gender, and a mortality rate.

The system and method calculates the delta, gamma, vega, theta, rho and other first order, higher order and cross gammas for the insurance product. Then, active hedging is executed.

The present invention also comprises a system and method for hedging risks associated with an insurance instrument with benefits, the method including the steps of providing a plurality of insurance instruments with benefits, calculating a plurality of risk statistics based on characteristics of the plurality of insurance instruments with benefits, and hedging the risks associated with the insurance instruments by purchasing option contracts based, at least in part, on a hybrid derivative.

The present invention further comprises a method and system for managing risks associated with an insurance instrument issued by an insurance provider. The system includes a data storage module for storing information associated with the insurance instrument and a computing system in electronic communication with the data storage module and the insurance provider, the computing system including a hedging engine.

The hedging engine is operable to calculate one or more risk statistics based on the information associated with the guaranteed variable annuity contracts and to identify a hedge position to mitigate risks associated with the insurance instrument using hybrid based derivatives.

The hedging engine may include a trading system for executing trades associated with the identified hedge positions.

The computing system may also include a risk assessment module for assessing the risks associated with the issuance of the insurance instrument, the risks including behavior risks and market risks. The computing system includes a display module, a data entry module, a processing module, a calculation module and one or more communication modules. The computer system also includes a reporting module for producing reports of information associated with the insurance instrument.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems and methods for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
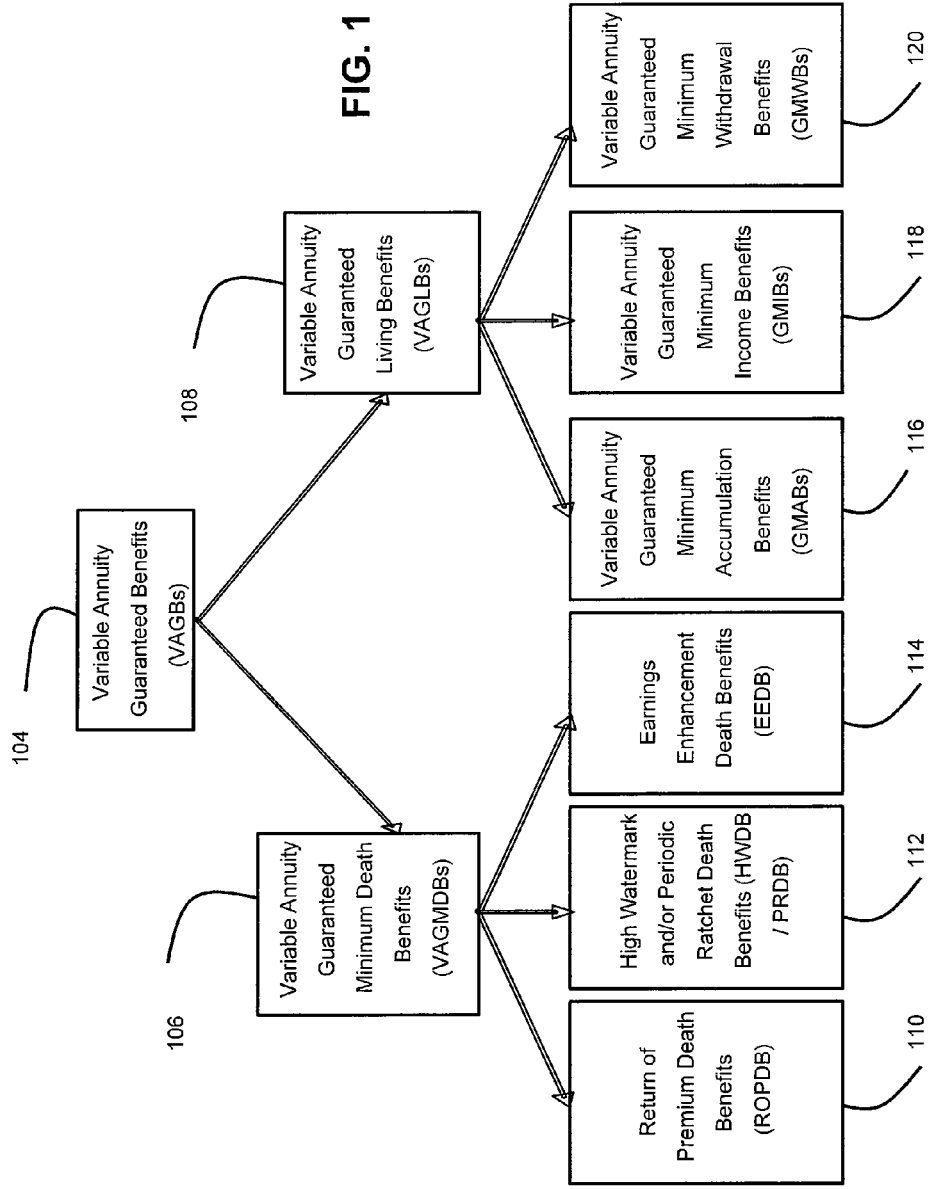
FIG. 1 is a diagram depicting several different categories of variable annuity guaranteed benefits.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Among other factors, hedging effectiveness on VA guarantees using generic hedging instruments, known as "vanilla hedging instruments," is dependent upon the size, frequency and correlation of movements in critical capital markets variables. Generally, small changes in valuation inputs will not cause a hedge to materially lose effectiveness. Depending upon the nature of the guarantee written, as well as upon the exact instruments chosen for hedging, there are two characteristics of VA guarantee liabilities that cause hedging ineffectiveness in existing systems for guaranteeing benefits using hedging: 1) the instance where valuation inputs experience large and/or sudden changes, and 2) when several of the inputs move together.

The first instance is known as a "higher-order exposure." Generally speaking, this refers to a scenario in which a single valuation input experiences a move which is much different (i.e. larger) in size than the change used to compute the asset and liability Greeks.

Effectively, what takes place in the higher-order exposure scenario is as follows:

Greeks are computed for a specified change in a particular valuation input.

Asset and liability Greeks are matched on this basis.

The actual change in the valuation input is much larger than the specified shock implemented in the Greek calculation.

The rate of change of the liability Greek with respect to the valuation input is different than the rate of change of the asset Greek with respect to the valuation input.

The result is that as the change in the valuation input takes place, the difference between $\delta_A$ and $\delta_L$ grows, leaving the net position mishedged and causing hedging inefficiency.

In mathematical terms, this can be thought of as the second, and higher-order terms in the following equation known in the art as the "Taylor expansion."

$$f(x+h) = f(x) + \frac{df}{dx}(x) \cdot h + \sum_{i=2}^{\infty} \frac{1}{i!} \cdot h^i \cdot \frac{d^i f}{dx^i}(x),$$

Consequently, the change in $f$ is as follows:

$$f(x+h) - f(x) = \frac{df}{dx}(x) \cdot h + \sum_{i=2}^{\infty} \frac{1}{i!} \cdot h^i \cdot \frac{d^i f}{dx^i}(x).$$

A first-order Greek hedge is designed to offset the largest and most prominent portion of this change, the first term, $$\frac{df}{dx}(x) \cdot h,$$

on the right-hand side of the above equation. In conventional systems, it may not be desirable or possible with traditional hedging instruments, to fully hedge the incremental "higher order" exposures on the right hand side of the above equation. This turns out to be inconsequential if $h$ is small since in that case $$\frac{1}{i!} \cdot h^i$$

will also be very small for i≥2. However, as $h$ increases, the incremental impact of the "higher-order" hedge mismatches becomes more prominent.

Hedging programs for VA guarantees can sometimes have significant higher-order exposures. A key example is the change in $\kappa_L$ as implied volatility changes ("dVegadVol"). Another key example is the change in $\delta_L$ the index price changes, sometimes known as $\Gamma_L$, ("gamma"). Yet a third example, known as the third order exposure, is the change in $\Gamma_L$ as the index price changes, sometimes also known as "speed."

The second characteristics of VA guarantee liabilities, which cause hedging ineffectiveness in existing systems for guaranteeing benefits using hedging, is related to but slightly different from the previously discussed concept of higher-order exposure, and is known in the art as "cross-gamma." Whereas a higher-order exposure describes hedging inefficiency resulting from a large move in a single valuation input, a cross-gamma is hedging inefficiency resulting from a hedging mismatch in one Greek created by the movement of the underlying input, and one or more of the other valuation inputs.

There are a very large number of possible cross-gammas. Since valuations with greater than two-factors (such as VA guarantee liabilities) have an analogous, but exacerbated, form of this issue, the concept of cross-gamma is illustrated herein with respect to a simplified, two-factor example. For two-dimensional functions, the Taylor series is defined as follows:

$$f(x+h, y+k) = f(x, y) + \frac{df}{dx}(x, y) \cdot h + \frac{df}{dy}(x, y) \cdot k + \frac{1}{2} \cdot h^2 \cdot \frac{d^2 f}{dx^2}(x, y) + \frac{1}{2} \cdot k^2 \cdot \frac{d^2 f}{dy^2}(x, y) + h \cdot k \frac{d^2 f}{dydx}(x, y) + O(3+)$$

where O(3+) denotes all terms of order 3 and higher. In this case, it is apparent through the cross terms that the change in $f$ is:

$$f(x+h, y+k) - f(x, y) = \frac{df}{dx}(x, y) \cdot h + \frac{df}{dy}(x, y) \cdot k + \frac{1}{2} \cdot h^2 \cdot \frac{d^2 f}{dx^2}(x, y) + \frac{1}{2} \cdot k^2 \cdot \frac{d^2 f}{dy^2}(x, y) + h \cdot k \frac{d^2 f}{dydx}(x, y) + O(3+)$$

and can be decomposed as:
the first order exposures, $$\frac{df}{dx}(x, y) \cdot h + \frac{df}{dy}(x, y) \cdot k,$$

described above and for which hedging may be more straightforward,
the second-order exposures, $$\frac{1}{2} \cdot h^2 \frac{d^2 f}{dx^2}(x, y) + \frac{1}{2!} \cdot k^2 \cdot \frac{d^2 f}{dy^2}(x, y),$$

described above, for which hedging is more difficult but sometimes possible, and
the cross-gamma exposure represented by $$h \cdot k \frac{d^2 f}{dydx}(x, y),$$

which is not present in the single-variable case.

An important concept, as seen above, is that the change in the function $f$ has a term dependent upon the partial derivative with respect to both variables. So even if hedging the first and higher-order exposures of the two inputs, namely x and y, ineffectiveness is still realized if the two variables moved at the same time.

This arises frequently in existing systems, in which interdependencies among valuation inputs are common and sometimes quite strong. A few key examples would be the dependency of $\kappa_L$ on changes in stocks and/or interest rates, sometimes referred to as "dVegadSpot" and "dVegadRates." These cross-gamma exposures can be severe in the case of VA guarantee liabilities and create hedging ineffectiveness when movements in these capital markets inputs occur simultaneously. Generally speaking, the hedging performance decreases as the size of the changes in the input variables increase.

Thus, for the above described reasons, existing systems for guaranteeing benefits using hedging are often incomplete and plagued with a lack of certainty that the assets generated from hedging would cover the liability stemming from VAGBs.

Because current hedging programs are incomplete and uncertain, there is a clear need in the art for a system and method to more effectively redistribute the risk associated with variable annuities. The present invention overcomes the various deficiencies associated with traditional hedging programs.

One example of second-order exposure is a put option written on a stock index. In the present example, if the stock index pays no dividends, and the current value of the index is 100, the strike price of the option is 100, the option would have 3 years to maturity, the risk-free rate would be 5% with continuous compounding, and the implied volatility for this particular option is 24%. In this example the notation $f(x)$ refers to the estimate of the valuation of this option when the level of the index is x.

Furthermore, if the above valuation parameters are inserted into a valuation model and the base valuation of this option is computed to be $f(100)=9.32$. The option's delta is computed through a finite-differencing scheme as follows:

$$\delta = f(101) - f(100).$$

The underlying index is perturbed by 1 to compute this sensitivity. The resulting estimate of the delta is:

$$\delta = f(101) - f(100) = 9.04 - 9.32 = -0.28.$$

Thus, if the first-order delta hedge is set-up by selling short 0.28 shares of the underlying index, if the index appreciates by 1 the gain is 0.28 by virtue of the fact that the written option is less valuable, but lost 0.28 on the position in the stock index, leaving the net change in economic value at 0.

However, if the index were to suddenly fall by 5, from the Taylor expansion, the portion of the change in the option's value, that is explained by the first-order effect of the index rising is as follows:

$$\frac{df}{dx}(x) \cdot h = (-0.28) \cdot (-5) = 1.4.$$

The position in the stock index will experience an offsetting gain of $0.28 \cdot 5 = 1.4$. However, the actual change in the value of the option is determined using the valuation model as follows:

$$f(95) - f(100) = 1.53,$$

This suggests that higher-order delta impacts worth is determined by the following method:

$$\sum_{i=2}^{\infty} \frac{1}{i!} \cdot h^i \cdot \frac{d^i f}{dx^i}(x) = [f(x+h) - f(x)] - \frac{df}{dx}(x) \cdot h$$

$$= 1.53 - 1.4$$

$$= 0.13.$$

Thus the net results are that:
  The option position increased in value by 1.53.
  The portion of this change attributable to first-order impact is 1.40.
  This portion was hedged by the short position in the underlying stock index, and so a gain of 1.4 was experienced on that position which offset the first-order effect of the change in the value of the put option.
  The remainder, 0.13, is an unhedged loss arising from higher-order impacts of the option valuation with respect to changes in the stock index.

The above example illustrating the impacts of higher-order exposures focused on the stock index price as the lone stochastic variable in the valuation of the written put option. However, the above example is simplified to illustrate one type of impact.

A second example is now detailed. Expanding the above example allows including the implied volatility as an additional stochastic variable in the valuation of the written put option in order to demonstrate the concept of cross-gamma exposure. However, in reality there are many more stochastic variables in the valuation of VAGBs, which create many more first-order, higher-order, and cross-gamma exposures that need to be quantified and managed.

In this example the written put option is with respect to a stock index that pays no dividends, and the current value of the index is 100, the strike price of the option is 90, the option has 3 years to maturity, the risk-free rate is 5% with continuous compounding, and the implied volatility for this particular option is 24%. The notation $f_L(x,y)$ refers to the estimate of the valuation of this option when the level of the index is x and the level of implied volatility is y.

First computing the Greeks of the written put option using finite-differencing to compute estimates of the first and second derivatives, yields the following:

$$\frac{\partial f_L}{\partial x} = \frac{f_L(101, 0.24) - f_L(100, 0.24)}{1}$$
$$= 5.76 - 5.96$$
$$= -0.20$$

$$\frac{\partial f_L}{\partial y} = \frac{f_L(100, 0.25) - f_L(100, 0.24)}{.01}$$
$$= \frac{6.45 - 5.76}{.01}$$
$$= 49.611$$

$$\frac{\partial^2 f_L}{\partial x^2} = \frac{f_L(101, 0.24) + f_L(99, 0.24) - 2f_L(100, 0.24)}{1^2}$$
$$= \frac{5.76 + 6.17 - 2(5.96)}{1^2}$$
$$= .006845$$

$$\frac{\partial^2 f_L}{\partial y^2} = \frac{f_L(100, 0.25) + f_L(100, 0.23) - 2f_L(100, 0.24)}{.01^2}$$
$$= \frac{6.45 + 5.47 - 2(5.96)}{.01^2}$$
$$= 68.7157$$

$$\frac{\partial^2 f_L}{\partial x \partial y} = \frac{\frac{f_L(101, 0.25) - f_L(101, 0.24)}{.01} - \frac{f_L(100, 0.25) - f_L(100, 0.24)}{.01}}{1}$$
$$= -0.4649$$

In this example, 0.6492 call options were bought on this stock index which are 5 years in maturity and have a 110 strike. The notation $f_O(x,y)$ refers to the estimate of the valuation of this option when the level of the index is x and the level of implied volatility is y.

Thus, computing the Greeks of the call option owned in the above example using finite-differencing to compute estimates of the first and second derivatives, is done as follows:

$$\frac{\partial f_O}{\partial x} = \frac{f_O(101, 0.24) - f_O(100, 0.24)}{1}$$
$$= 18.38 - 17.91$$
$$= 0.46$$

-continued $$\frac{\partial f_O}{\partial y} = \frac{f_O(100, 0.25) - f_O(100, 0.24)}{.01}$$
$$= \frac{18.41 - 17.91}{.01}$$
$$= 49.611$$

$$\frac{\partial^2 f_O}{\partial x^2} = \frac{f_O(101, 0.24) + f_O(99, 0.24) - 2f_O(100, 0.24)}{1^2}$$
$$= \frac{18.38 + 17.45 - 2(17.91)}{1^2}$$
$$= .004135$$

$$\frac{\partial^2 f_O}{\partial y^2} = \frac{f_O(100, 0.25) + f_O(100, 0.23) - 2f_O(100, 0.24)}{.01^2}$$
$$= \frac{18.41 + 17.42 - 2(17.91)}{.01^2}$$
$$= 2.33445$$

$$\frac{\partial^2 f_O}{\partial x \partial y} = \frac{\frac{f_O(101, 0.25) - f_O(101, 0.24)}{.01} - \frac{f_O(100, 0.25) - f_O(100, 0.24)}{.01}}{1}$$
$$= -0.016$$

If the shares are sold short 0.66 of the index, which has a delta of $\delta_S = -0.66$ and no other sensitivities, the total asset sensitivities in this case would be:

$$\frac{\partial f_A}{\partial x} = \delta_O + \delta_S$$
$$= 0.46 + (-0.66)$$
$$= -0.20$$

$$\frac{\partial f_A}{\partial y} = \frac{\partial f_O}{\partial y}$$
$$= 49.611$$

$$\frac{\partial^2 f_A}{\partial x^2} = \frac{\partial^2 f_O}{\partial x^2}$$
$$= .004135$$

$$\frac{\partial^2 f_A}{\partial y^2} = \frac{\partial^2 f_O}{\partial y^2}$$
$$= 2.33445$$

$$\frac{\partial^2 f_A}{\partial x \partial y} = \frac{\partial^2 f_O}{\partial x \partial y}$$
$$= -0.016$$

If the index drops from 100 to 95 (i.e. h=−5) and the implied volatility increases 4% on an absolute basis (i.e. k=0.04) the total economic impact, can then be computed by revaluing all of the positions.

The change in the liability is computed using the method below:

$$f_L(95, 0.28) - f_L(100, 0.24) = 3.20,$$

the change in the assets would then be:

$$f_A(95, 0.28) - f_A(100, 0.24) = f_O(95, 0.28) - f_O(100, 0.24) + (-0.66)(-5) = -0.28 + 3.33 = 3.05$$

The net economic impact is therefore a loss of:

$$3.20 - 3.05 = 0.15.$$

This change can be understood as follows:
The first order impacts of the liability are:

$$\frac{df_L}{dx}(x, y) \cdot h + \frac{df_L}{dy}(x, y) \cdot k = -0.20(-5) + 49.611(.04)$$
$$= 1 + 1.98$$
$$= 2.98.$$

Similarly, the first order impacts of the assets are:

$$\frac{df_A}{dx}(x, y) \cdot h + \frac{df_A}{dy}(x, y) \cdot k = -0.20(-5) + 49.611(.04)$$
$$= 1 + 1.98$$
$$= 2.98.$$

Thus the net impact of first-order impacts is zero (by design).
The single-variable second order impacts of the liability are:

$$\frac{1}{2} \cdot h^2 \cdot \frac{d^2 f}{dx^2}(x, y) + \frac{1}{2} \cdot k^2 \cdot \frac{d^2 f}{dy^2}(x, y) = \frac{1}{2} \cdot (-5)^2 \cdot (.006845) + \frac{1}{2} \cdot (.04)^2 \cdot (68.7157)$$
$$= 0.14$$

The single-variable second order impacts of the assets are:

$$\frac{1}{2} \cdot h^2 \cdot \frac{d^2 f_A}{dx^2}(x, y) + \frac{1}{2} \cdot k^2 \cdot \frac{d^2 f_A}{dy^2}(x, y) = \frac{1}{2} \cdot (-5)^2 \cdot (.004135) + \frac{1}{2} \cdot (.04)^2 \cdot (2.3345)$$
$$= 0.05$$

Therefore, slippage of 0.09 will result from mismatched single-variable second-order exposures.
The second-order cross-gamma impact of the liability is:

$$h \cdot k \frac{d^2 f_L}{dy dx} = -5 \cdot .04 \cdot (-0.4649)$$
$$= .093,$$

and

The second-order cross-gamma impact of the assets is:

$$h \cdot k \frac{d^2 f_A}{dy dx} = -5 \cdot .04 \cdot (-0.016)$$
$$= .003.$$

Therefore, a cross-gamma loss of 0.09 will be experienced.
The remainder of the unexplained difference, after subtracting the impact of first-order, single-variable second-order, and a second-order cross-gamma term, is:

$$0.15 - 0.00 - 0.09 - 0.09 = -0.03,$$

implying that a gain of 0.03 was made on the third- and higher-order Greeks and cross-gammas.

In the example above, the total contribution to the net economic change in value resulting from higher-order and cross-gamma exposure was a loss of 0.15. This demonstrates the potential economic consequences from mismatched higher-order and cross-gamma exposures.

The present invention utilizes customized derivatives which embed equity and interest rate exposure simultaneously to provide mitigation of cross-gamma exposure.

Figure 2:
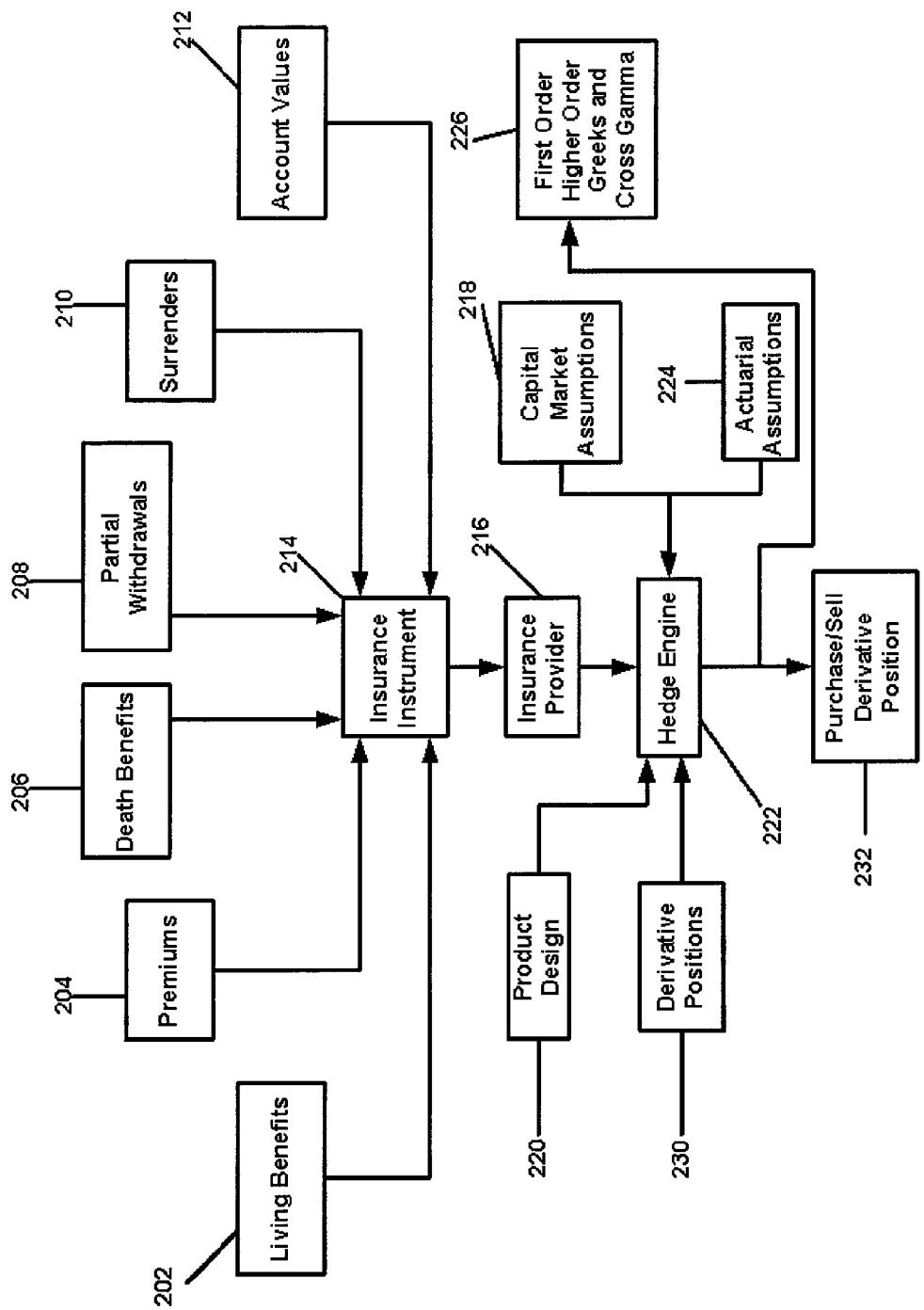
FIG. 2 is a diagram depicting a method for an insurance provider to reduce the risk of providing the insurance instrument in accordance with an embodiment of the present invention.

FIG. 2 is a diagram depicting a method for an insurance provider to reduce the risk of providing the insurance instrument. The premium payments 204, death benefits in-force 206, living benefits 202, partial withdrawals 208, surrenders 210 and account values 212 are summarized into in-force contract details 214. The data is forwarded to the insurance provider 216, and analyzed. One aspect of the analysis summarizes the in-force data of all the contracts. The output from the in-force contract detail system is fed into the hedge engine 222. The hedge engine 222 projects forward the financial results obtained for the company based upon the types of investments in the variable accounts and capital market assumptions.

The product characteristics 220 of the insurance instrument are input into the hedge engine 222. Product characteristics 220 include: living benefit guarantees, death benefit guarantees, minimum income guarantees, etc.

Capital market assumptions 218 are input into the hedge engine 222. These assumptions include risk free rates, volatilities, correlations of funds, and any other statistical measurements and data describing the conditions of the capital markets. Risk neutral and real world assumptions may also be used as input items.

The characteristics of the derivative positions 230 are also used as inputs into the hedge engine 222. The hedge engine calculates the first order, higher-order and cross-gamma values 226.

Actuarial assumptions 224 are used to provide mortality rates, surrender rates, partial withdrawal rates, fund mapping and expenses. Wherein, fund mapping is the process of analyzing separate account funds and assigning them to indices that can be hedged.

The hedge engine 222 calculates the amount of available options to be purchased and uses cash and derivative options.

The output from the hedge engine 222 is the specific buy and sell positions 232 that provide the balance.

Figure 3:
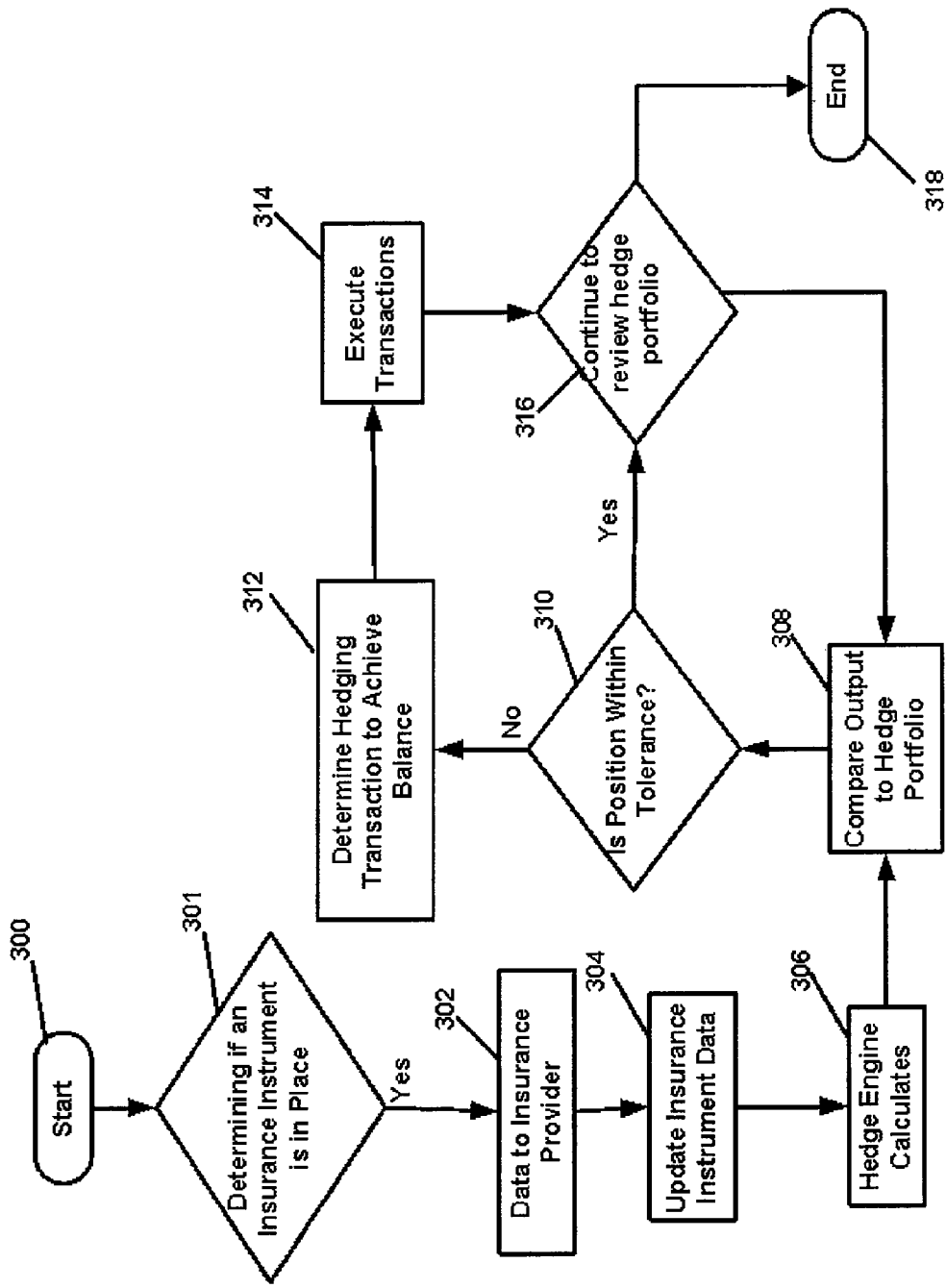
FIG. 3 is a diagram depicting the method by which the system of the present invention reviews and adjusts hedge positions for hedging the risks inherent in an insurance instrument in accordance with an embodiment of the present invention.

FIG. 3 depicts the method by which the system of the present invention reviews and adjusts hedge positions for hedging the risks inherent in an insurance instrument. The procedure starts in step 300, it is determined if an insurance instrument is in place with the insurance provider in step 301. If such an instrument is in place, the data describing the various characteristics of the instrument is sent to the insurance provider 302. The insurance instrument data is updated 304 and supplied to the hedge engine. The hedge engine, using the above described inputs, calculates 306 one or more portfolios that include various hedge positions for hedging the risks inherent in the insurance instrument.

One or more of the resulting portfolios is then selected as the desired portfolio. The result is compared 308 to the existing portfolio. One or more tolerance bands may be established to determine if adjustments to the portfolio are necessary and used when comparing the existing portfolio to the new portfolio 310. It is determined if the review process is to continue in step 316, if the new portfolio is within the tolerance bands the review process continues in step 308. However if it is determined that the review process is not to continue, the procedure ends in step 318.

However, if the selected portfolio is outside the established tolerances, the hedge transactions that will create the selected portfolio are determined 312, and executed 314. The procedure ends in step 318.

The procedure described in FIG. 3 may be implemented by: an insurance provider, a reinsurance provider, a derivative counter party, and any other relevant party concerned with the hedging aspect of the present invention.

Figure 4:
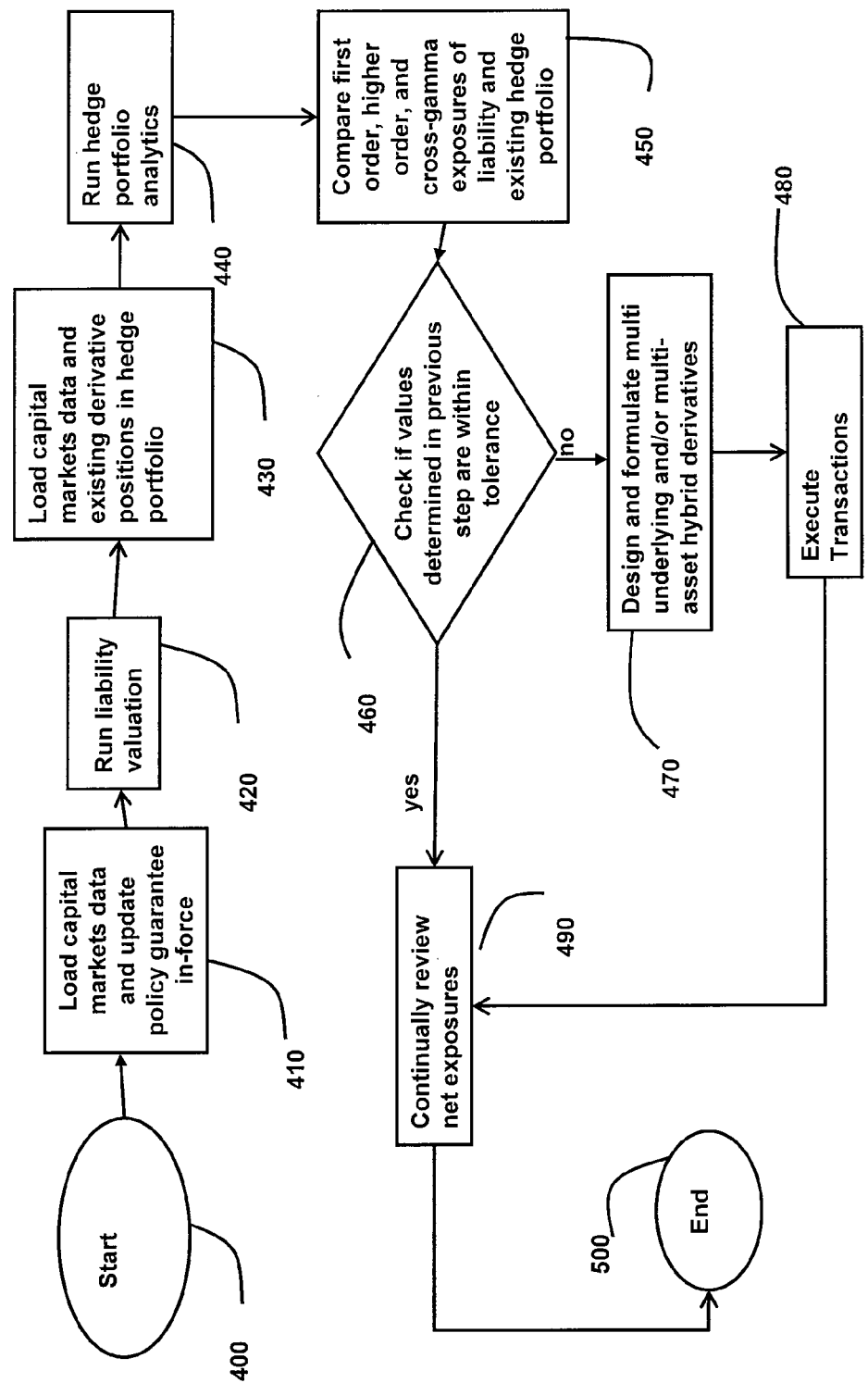
FIG. 4 is a flow chart depicting the hedging method in accordance with an embodiment of the present invention.

The following depicts the hedging methods which are described more specifically in FIG. 4. Hedging programs can vary significantly but generally proceed according to the following pseudo-algorithm:

Construction of a mathematical valuation model to compute an estimate of the value of the written guarantee liability, conditional upon a set of relevant capital markets data and assumptions for annuitant behavior.

Gathering required capital markets data, dependent upon the structure of the guarantee and the contractually permissible set of investment options, but generally including:

The spot price of relevant equity indices.

The term structure of interest rates denominated in all of the currencies that are reflected in the valuation model.

The spot price of relevant cross-currency exchange rates associated with all of the currency pairs that are reflected in the valuation model.

The forward implied dividend curves for each of the relevant equity-indices.

A sub-model for the volatility associated with the price of the equity indices.

A sub-model for the volatility associated with the relevant cross-currency exchange rates.

A sub-model for the volatility associated with the interest rates of all relevant term structure.

Formulating assumptions of annuitant behavior, dependent upon the structure of the guarantee, but generally including:

Assumed rates of mortality for individual annuitants, or a sub-model for stochastic mortality.

Assumed rates of lapsation for individual annuitants and/or a predefined algorithm (deterministic or stochastic) for future lapsation rates that is a function of other variables in the valuation (so-called "dynamic lapsation").

Assumed rates of utilization for behavioral choices granted to the contract holder under the terms of the guarantee, such as size and frequency of periodic withdrawal of funds from the variable annuity contract and/or a predefined algorithm (deterministic or stochastic) for future utilization that is a function of other variables in the valuation ("dynamic utilization").

Size, style and frequency of transfer of funds between investment options and/or a predefined algorithm (deterministic or stochastic) for future transfers that is a function of other variables in the valuation.

Defining a series of sets of unexpected fluctuations ("shocks") to be applied to capital markets data.

Running the valuation model and computing an estimate of the valuation of the written liability under the "base case" market data and under each set of shocks. This information can be used to determine an estimate of the base valuation of the written liability and of the sensitivities of the valuation estimate to changes in specific capital markets data. (The estimate of the base valuation of the written liability and the estimate of the sensitivities of the valuation estimate to changes in specific capital markets data are known in the art as "Greeks").

Formulating a hedge portfolio and executing an analogous valuation/sensitivity exercise to calculate the base valuation and the Greeks.

Executing trades in the hedge portfolio that position the aggregated Greeks of the hedge portfolio to be within desired ranges relative to the liability Greeks.

FIG. 4 depicts the hedging methods of an embodiment of the present invention. The method starts in step 400, the updated in-force policy, guarantee, and capital markets data loaded in step 410, the liability valuation engine is run in step 420, the existing derivative positions in hedge portfolio and capital markets data are loaded in step 430, running the hedge portfolio analytics in step 440, comparing the first-order, higher-order, and cross-gamma exposures of liability and existing hedge portfolio 450, the values determined in step 450 are checked against a predetermined tolerance in step 460, if the values are within tolerance steps 470 and 480 are skipped and the net exposures are continuously reviewed in step 490. However if the values are determined to not be within the tolerance in step 460 multi-asset hybrid derivatives and/or multi-underlying hybrid derivatives are designed and formulated in step 470, the transactions are then executed in step 480, subsequently the net exposures are continuously reviewed in step 490 and the procedure ends in step 500.

Unlike standard vanilla call and put options, equity/interest rate hybrid derivatives do not conform to a single payoff function definition, owing to the very unique structuring opportunities within the OTC derivatives market. In general, these structures will combine the performance of certain equity indices and certain interest rates into the payoff function, they will utilize a more complex model for valuation that reasonably approximates the joint probability density function of the relevant variables.

An example of one structure that illustrates the concept of equity/interest rate hybrid derivatives is the hybrid corridor index put option, which has the payoff function $\max(0, K-S_T) \cdot L(r_T)$, where:

K is the strike price $S_T$ is the value of the underlying equity index at the maturity of the option $r_T$ is the value of the 10 yr. USD par swap rate at the maturity of the option $$L(x) = \begin{cases} UU, & \text{if } r_T \geq UB \\ LU + (UU - LU) \cdot \frac{r_T - LB}{UB - LB} & \text{if } LB < r_T < UB \\ LU, & \text{if } r_T \leq LB \end{cases}$$

For VA hedging it will generally be the case that UU<LU and LB<UB to ensure that the leverage afforded to the structure rises as interest rates fall.

Figure 5:
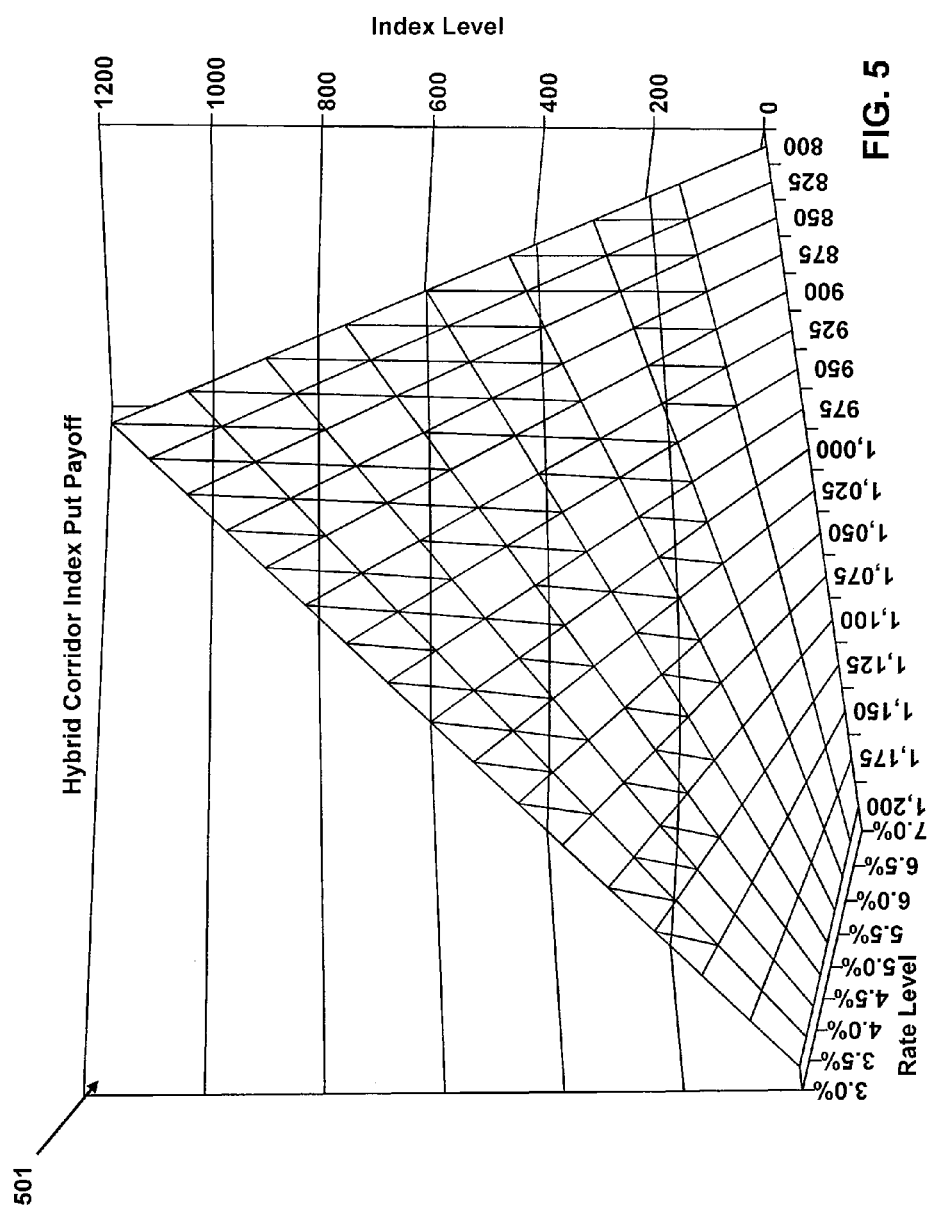
FIG. 5 is a graph of the payout structure of a hybrid corridor index put option

FIG. 5 depicts an example of the payout structure 501 of a hybrid corridor index put option for which the values UU=0, LU=3, LB=0.03, UB=0.07, and K=1200 are assumed.

However, there are many other design which may be used to without departing from the spirit of the present invention. The list below details some of those examples; nevertheless, it should not be considered exhaustive:

Equity, equity index, equity basket, or equity index basket options, swaps, or other derivatives that produce expanded or contracted notional based upon the level of an interest rate or a combination of interest rates or on the spread between two or more interest rates.

Equity, equity index, equity basket, or equity index basket options, swaps, or other derivatives that "knock in" or "knock out", or some variation, based upon one or more interest rates reaching or falling below certain levels.

Interest rate swaps, caps, floors, swaptions, options, or other derivatives whose notional expands or contracts, or for which the amount of leverage is otherwise changed, as a function of the level of stocks or stock indices.

Equity, equity index, equity basket, or equity index basket option, swap, or other derivative whose moneyness is altered in some way based upon the level of an interest rate or a combination of interest rates or on the spread between two or more interest rates, either by adjusting the strike price of the option or by altering the contractually realized number, which, for the purposes of the option's payoff, will be considered the "fixing" or "observation" of the underlying(s).

Interest rate swaps, caps, floors, swaptions, options, or other derivatives whose moneyness is altered in some way based upon the level of an individual equity, equity index, basket of individual equities, basket of equity indices, or some combination thereof, either by adjusting the strike price of the option or by altering the contractually realized number, which, for the purposes of the option's payoff, will be considered the "fixing" or "observation" of the underlying(s).

Figure 6:
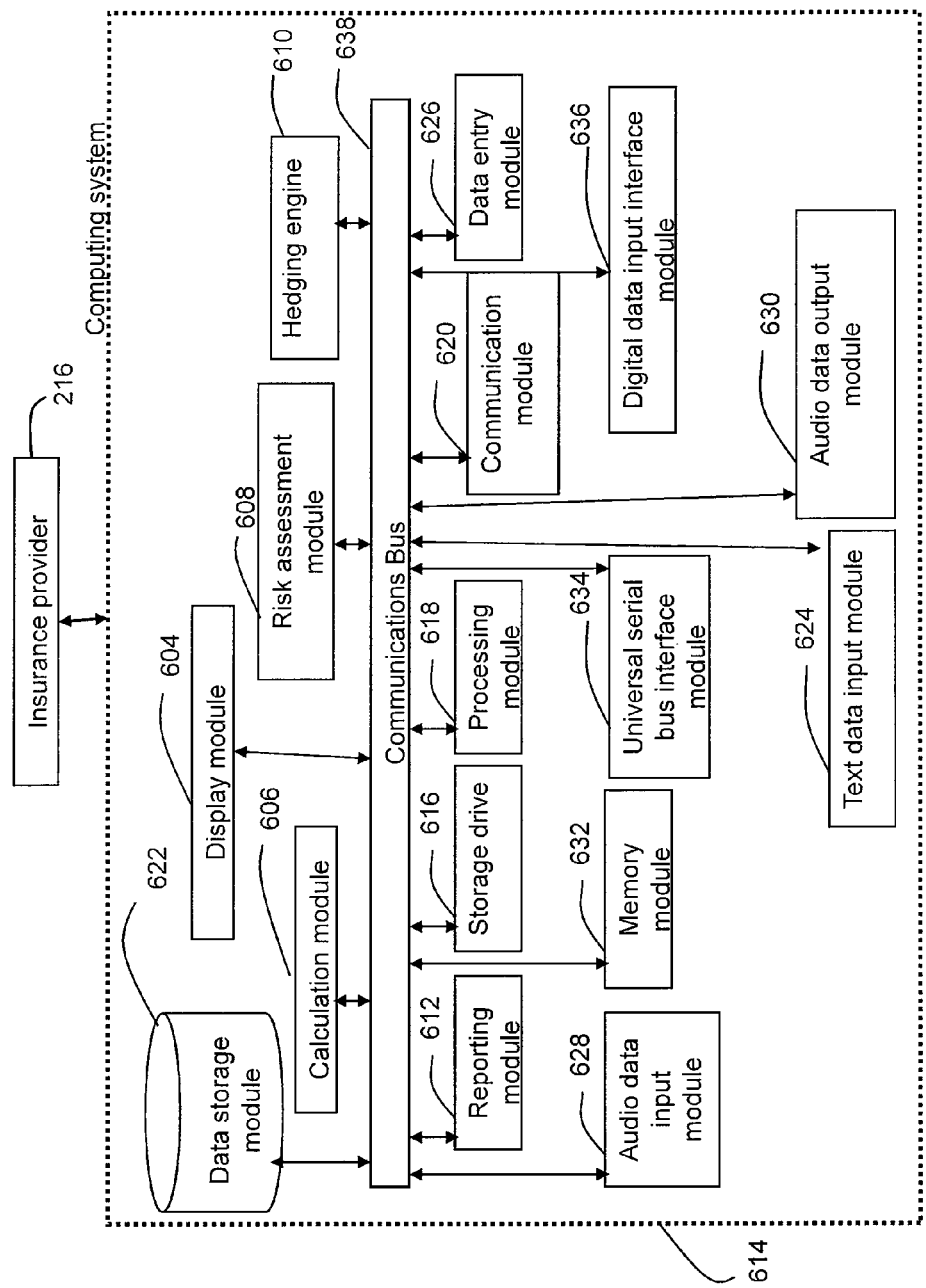
FIG. 6 is a diagram depicting the system on which the methods of the present invention may be implemented in accordance with an embodiment of the present invention.

Referring to FIG. 6, FIG. 6 depicts an embodiment of a system on which the methods described above may be implemented. The present invention relates to equity/interest rate hybrid hedging system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software. Suitable computer program code may be provided for performing numerous functions such as mitigating risks associated with an insurance instrument, determining hedging transactions to meet required characteristics of risks associated with the insurance instrument, and mitigating the risks associated with the insurance instrument by executing hedging transactions. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

All of the modules described herein are operably interconnected via a bi-directional connection with a central serial bus 638. The serial bus 638 serves to receive information from every single module, as well as to transmit information from one module to another. The insurance provider 216 transmits and receives data, to and from the computing system via any standard means known in the art. The communication module 620 transmits and receives data, to and from the computing system 614 via any standard electronic means known in the art. The computing system 614 consists of: a display module 604, a data entry module 626, and a processing module 618. The processing module is generally used to process information as well as to perform any other processes not specifically assigned to any other module within the computing system 614.

Furthermore, the computing system 614 includes a risk assessment module 608, wherein the risk assessment module 608 may be used for assessing the risks associated with the issuance of an insurance instrument, and wherein the risks include market risks and behavior risks.

Additionally, the computing system 614 includes a hedging engine 610. The hedging engine 610 may be used for hedging risks associated with the issuance of an insurance instrument, and for participating in hedging transactions which utilize derivatives.

In addition the computing system 614 includes a reporting module 612. The reporting module 612 may be used for producing reports of information associated with said insurance instrument, as well as any other kinds of related reports.

The data storage module 622 may be external to the computing system 614, for the purposes of allowing further controls of data access, to be implemented if needed. However, a data storage module 622 which is internal to the computing system 614 may be used without departing from the spirit of the present invention.

Additionally, the computing system 614 includes: a text data input module 624 for inputting data in the form of text, a data entry module 626 for entering a variety of forms of data and inputting the data into the computing system 614.

Finally, the computing system 614 includes: a storage drive 616, an audio data input module 628 for receiving and inputting audio information, a calculation module 606 for performing any necessary mathematical calculations, a memory module 632 for temporarily storing information as it is being processed by the processing module 618, a universal serial bus interface module 634 for receiving and transmitting data to and from devices capable of establishing a universal serial bus connection, and a digital data input interface module 636 for receiving data contained in digital storage devices (e.g. floppy disk, zip drive, 8 mm digital tape, etc), and an audio data output module 630.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

In general, the equity/interest rate hybrid derivative concept encapsulates any derivative, or any investment vehicle with an embedded derivative, that contains a payoff formula(s). At a minimum the formula(s), is/are a function of the performance of the following two items jointly, except traditional call and put options on a basket of mixed underlyings:

1. Any single or packaged combination of individual equities, equity indices, exchange-traded funds, equity futures, and/or equity forwards, and
2. Any single interest rate, combination of interest rates, or observation(s) of the joint behavior of one or more interest rates, or one or more indices linked to interest rates, or any single fixed income instrument or combination of fixed income instruments, or any single fixed income index or combination of fixed income indices, or any combination of any two or more of the items listed above. This is irrespective of issuer, currency of denomination, representative tenor, compounding style and/or frequency.

Additionally, even though a motivation for the use of equity/interest rate hybrids for VA hedging may be the higher-order and cross-gamma impacts, these instruments can be equally applied for hedging first-order Greeks. Naturally they will have first-order exposures and so they may be appropriate for first-order hedging as well.

Furthermore, due to the multi-underlying exposure of traditional VAGBs and the associated higher-order exposures and cross-gammas, it may be the case that different hybrid designs also incorporate additional underlyings other than those specifically referenced above. Some examples might be, the inclusion of an additional factor in the payoff formula which is generated from the volatility exhibited by the underlying(s) or by the dividends paid on the underlying(s). These designs can be used without departing from the spirit of the present invention and are also applicable to the concept of "hybrids", as they act to improve the higher-order and cross-gamma profile of the VAGB hedger.

An illustrative example of the concept of hybrid hedging is outlined bellow. Supposing that there are 100 identical variable annuity policies sold, each of which has identical characteristics as described below:

Each policy has a variable annuity contract currently valued at $110. The policyholders elected a minimum guarantee from the insurer that expires in 1 year.
A description of the performance guarantee is as follows:
If on the guarantee maturity date a given policy is worth at least $100, then the performance guarantee is met
Otherwise, the investment performance is viewed as inadequate and the insurer is obligated to pay the policyholder the difference between $100 and the actual contract value. However, the payment will be made over 10 years, in 10 equal installments, with the first payment made on the 1-year anniversary of the guarantee maturity.
The lone investment option is a fund that exactly mirrors the performance of the ABC equity index.
Furthermore, in this example policyholders are assumed to lapse their VA contracts (and thus terminate any contractual investment guarantee obligation that would otherwise have been borne by the annuity writer) according to the following algorithm:
If the performance guarantee is met then 30 of the policies are assumed to terminate.
If the insurer's incremental cost of funding the performance guarantee as of the date on which the guarantee expires is greater than 0% but less than or equal to 3% of the current contract value (i.e. the policyholders are only slightly motivated to keep the contract in force), then 20 of the policies are assumed to terminate
If the insurer's incremental cost of funding the performance guarantee as of the date on which the guarantee expires is greater than 3% but less than or equal to 10% of the current contract value (i.e. the policyholders are moderately motivated to keep the contract in force), then 10 of the policies are assumed to terminate.
If the insurer's incremental cost of funding the performance guarantee as of the date on which the guarantee expires is greater than 10% of the current contract value (i.e. the policyholders are very motivated to keep the contract in force), then 3 of the policies are assumed to terminate.

Additionally, the valuation assumptions are as follows:
The spot price of the ABC index at the inception of the contract is 110.
The variable annuity contract has no fees.
Interest rates are flat at 5% with continuous compounding.
The ABC index pays no dividends.
The Black-Scholes implied volatility of options on the ABC index is 20% today.
The market-implied correlation between the absolute change in the continuously compounded short rate and the log-return of the ABC index is 20%.
The fair values of the liability, and of the hybrid derivative described below, are estimated via a 500,000-path Monte Carlo simulation using a 2-factor stochastic model:
A 1-factor Hull-White model for interest rates:

$$dr_t = \alpha(t)[\theta(t)-r_t]dt + \sigma_r(t)dZ^{(1)}$$

A 1-factor, constant volatility model for the ABC index which assumes geometric Brownian motion:

$$dS_t = [r_t - q_d]S_t dt + S_t \sigma_S(t) dZ^{(2)}$$

In the event that on the next business day there is a "crash" event in which the financial markets undergo significant turbulence:
   The price of the ABC index declines from 110 to 100. Interest rates decline 0.30%.
The writing insurance company has implemented a hedge in order to attempt to immunize the company from the risk associated with the fluctuations in the liability valuation estimate.
There are no transaction costs.

The above "crash" scenario is simplified in the sense that only two financial market variables are assumed to change. However, in reality, many more relevant valuation inputs can change and therefore a more expansive attribution than the one given below would generally be expected.

The purpose of this stylized example is to demonstrate the hedging efficiency which can be gained through the use of interest rate/equity hybrid options of the present invention in circumstances in which multiple movements by critical financial market variables would otherwise have created significant performance issues for hedging programs.

In accordance with earlier notation, let $f_L(x,y,z)$ be the liability valuation estimate obtained when the value of the ABC index is x, the level of interest rates is y, and the level of ABC index implied volatility is z. Similarly, the functions $f_{H1}(x,y,z)$ and $f_{H2}(x,y,z)$ refer to the valuation of two separate hedge portfolios.

Table 1 as seen below, depicts the estimated liability valuation before and after the "crash" event described above. Note that the unhedged liability valuation estimate has increased by about 196.40 over that timeframe (an economic loss for the company).

TABLE 1

Summary of Liability Valuation Change

| Market Conditions | ABC Index Price | Interest Rate Levels | Liability Valuation Estimate |
|---|---|---|---|
| Pre-"Crash" | 110.00 | 5.00% | 174.45 |
| Post-"Crash" | 100.00 | 4.70% | 370.85 |
| Change | | | 196.40 |

For example hedge portfolio 1 ("H1"), having holdings as follows:
   65.06 units of 1-year ABC indeed puts with a strike price of 100.
   0.2644 shares of the ABC index.
   A 7-year zero-coupon bond with a face value of 172.60.
Where, the prices of these instruments would then be as follows:
   181.25 for the options.
   0.2644(110)=29.08 for the ABC shares.
   172.60$e^{-0.05(7)}$=121.63 for the bonds.
Would have a cost of acquiring the portfolio of 331.96.

Further, hedge portfolio 2 ("H2"), whose holdings are as follows:
   0.2512 shares of the ABC index.
   Short position in 7-year zero-coupon bonds with a face value of 217.156.
   84.657 units of a 1-year hybrid corridor European ABC index option, whose payoff at expiration is equal to $\max(0, S_T-K) \cdot L(r_T)$, where:
      $S_T$ is the price of the ABC index on the expiration date of the option.
      K=100

$$L(r_T) = \begin{cases} 0.6, & \text{if } r_T \geq 0.7 \\ 1, & \text{if } r_T \leq .02 \\ 1 - 0.4\left(\frac{r_T - .02}{.05}\right), & \text{if } .02 < r_T < .07 \end{cases}$$

where $r_T$ is the 10 yr. nominal annual yield convertible semiannually.

The prices of these instruments are:
   181.33 for the options.
   0.2512(110)=27.63 for the ABC shares.
   −217.156$e^{0.05(7)}$=−153.03 for the bonds.
Would have a cost of acquiring the portfolio of 55.94.

Table 2, as shown below, depicts a comparison of the various sensitivities (up to and including $2^{nd}$ derivative terms) of the liability and of the two distinct hedging portfolios, namely H1 and H2. Note that both H1 and H2 are designed so that the first-order sensitivities are matched exactly (i.e. both portfolios would be delta-, rho-, and vega-neutral versus the liability).

TABLE 2

Summary of Liability and Hedging Portfolio sensitivities

| Item | df/dx | $d^2f/dx^2$ | df/dy | $d^2f/dy^2$ | $d^2f/dxdy$ | df/dz |
|---|---|---|---|---|---|---|
| Liability | −12.61 | 0.870 | −2494 | 36,700 | 168 | 2,054 |
| H1 | −12.61 | 0.838 | −2494 | 17,748 | 90 | 2,054 |
| H2 | −12.61 | 0.842 | −2494 | 38,461 | 227 | 2,054 |

However, inspection of the sensitivities contained in Table 2 reveals that the second-order and cross-gamma sensitivities of H1 and H2 are actually quite different. This implies that for appreciably sized and/or coincident changes in the valuation inputs, H1 and H2 are likely to respond quite differently. The actual changes in the portfolios' values can be determined by recalculating the value of each of the hedge instruments.

Tables 3 and 4, shown above, depict the pre- and post-"crash" valuations of H1 and H2, respectively, by component.

TABLE 3

H1 Valuation Change by Component

| Item | Options Value | ABC Shares Value | ZCB Value | Total Value |
|---|---|---|---|---|
| Pre-"Crash" | 181.25 | 29.08 | 121.63 | 331.96 |
| Post-"Crash" | 370.86 | 26.44 | 124.21 | 521.51 |
| Change | 189.61 | −2.64 | 2.58 | 189.55 |

TABLE 4

H2 Valuation Change by Component

| Item | Options Value | ABC Shares Value | SCAB Value | Total Value |
|---|---|---|---|---|
| Pre-"Crash" | 181.33 | 27.63 | −153.03 | 55.94 |
| Post-"Crash" | 382.35 | 25.12 | −156.28 | 251.19 |
| Change | 201.01 | −2.51 | −3.25 | 195.25 |

In this example, H1 produces a gain of 189.55 which would have left the VA writer with a net economic impact of 189.55−196.40=−6.86, or a loss of 6.86. H2 produces a gain of 195.25, which would have left the VA writer with a net economic impact of 195.25−196.40=−1.15, or a loss of 1.15.

Importantly, the dramatic reduction in hedge inefficiency (5.71) is achieved through the use of the hedging strategy containing a hybrid structure.

Tables 5 and 6, shown below, depict the net difference in the valuations of the liability and hedging portfolios, owing to changes in the various valuation inputs, as well as the breakdown of the 5.71 outperformance between H1 and H2 by mathematical order and valuation input. Thus Tables 5 and 6, also illustrate the outperformance of H2.

TABLE 5

Summary of Liability and Hedging Portfolio Valuation Changes According to Changes in x, y, and z

| Item | 1st Order x | 2nd Order x | 1st Order y | 2nd Order y | Cross-Gamma | 1st Order z | 3rd+ Order | Total Change |
|---|---|---|---|---|---|---|---|---|
| Liability | 126.12 | 43.51 | 7.48 | 0.17 | 5.05 | 0 | 14.08 | 196.40 |
| H1 | 126.12 | 41.92 | 7.48 | 0.08 | 2.71 | 0 | 11.23 | 189.55 |
| H2 | 126.12 | 42.08 | 7.48 | 0.17 | 6.82 | 0 | 12.58 | 195.25 |

TABLE 6

Performance Comparison H1 vs. H2, and Attribution of Hedging Inefficiencies

| Item | df/dx | $d^2f/dx^2$ | df/dy | $d^2f/dy^2$ | $d^2f/dxdy$ | df/dz | O(3+) | Total |
|---|---|---|---|---|---|---|---|---|
| H1 | 0.00 | (1.59) | 0.00 | (0.09) | (2.33) | 0.00 | (2.85) | (6.86) |
| H2 | 0.00 | (1.43) | 0.00 | 0.01 | 1.78 | 0.00 | (1.51) | (1.15) |
| Difference | 0.00 | 0.16 | 0.00 | 0.09 | 4.11 | 0.00 | 1.34 | 5.71 |

Several noteworthy features of the comparison illustrated in Tables 5 and 6 are:
- Both portfolios perform equally well to first-order, and the single-variable second-order impacts are different, however the differences are not dramatic.
- The dramatic differential in the cross-gamma term, an outperformance of 4.11, explains a significant portion of the overall outperformance.
- The superior third-order (and beyond) sensitivities, which although not individually attributed here, account for a large portion of the overall difference as well.

The above example illustrates the subject matter of the present invention, namely the equity/interest rate hybrid derivatives and their usefulness in hedging VA liabilities. However, the present invention is not limited to the values or methods of the above example, which is intended for illustrative purposes.

In general, the equity/interest rate hybrid derivative concept encapsulates any derivative, or any investment vehicle with an embedded derivative, that contains a payoff formula(s). At a minimum the formula(s), is/are a function of the performance of the following two items jointly, except traditional call and put options on a basket of mixed underlyings:

1. Any single or packaged combination of individual equities, equity indices, exchange-traded funds, equity futures, and/or equity forwards, and
2. Any single interest rate, combination of interest rates, or observation(s) of the joint behavior of one or more interest rates, or one or more indices linked to interest rates, or any single fixed income instrument or combination of fixed income instruments, or any single fixed income index or combination of fixed income indices, or any combination of any two or more of the items listed above.

In many cases the choice of parameters, or even more generally, the choice of the structural design of the hybrid derivative may depend on many factors, including the pricing environment, the exact nature of the liability, the extent to which it is desirable to hedge higher-order and cross-gamma exposures, and other factors.

Similar hedging effects may be realized by utilizing a hybrid design with a completely different functional payoff form, this can be done without departing from the spirit of the present invention. Furthermore, risk can be transformed, muted, eliminated, or left unhedged depending on the particular goals of the hedge without departing from the spirit of the present invention.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computerized system for mitigating risks of an issuer of an insurance instrument including formulating data specifying a risk mitigation portfolio that includes at least a first derivative that is a hybrid derivative selected to embed equity and interest rate exposure simultaneously and which exhibits a payoff formula that is a joint function of an equity index and an interest rate, comprising:
   a data storage device storing information associated with the insurance instrument;
   one or more computer processors in electronic communication with said data storage device and said issuer;
   a risk assessment module for assessing the risks associated with the issuance of said insurance instrument, said risks including behavior risks and market risks; and
   a risk mitigation engine for directly mitigating the risks of the issuer associated with said issuance of said insurance instrument by utilizing a risk mitigation instrument that is at least in part based on at least a first derivative, wherein the risk mitigation engine is configured to:
   calculate a base valuation estimate corresponding to the risks associated with said issuance of said insurance instrument and an estimate of sensitivities of the base valuation estimate to changes in capital markets data;

formulate, based on the base valuation estimate and the estimate of the sensitivities of the base valuation estimate, the data specifying the risk mitigation portfolio that includes the at least first derivative that is a hybrid derivative selected to embed the equity and the interest rate exposure simultaneously and which exhibits the payoff formula that is a joint function of the equity index and the interest rate;

transmit instructions which cause trades to be executed on behalf of the issuer based on the data specifying the risk mitigation portfolio that position the sensitivities of a valuation estimate of the risk mitigation portfolio within a desired range of the estimate of the sensitivities of the base valuation estimate;

determine whether exposure values corresponding to the risk mitigation portfolio are within a desired range of the estimate of the sensitivities of the base valuation estimate by continuously reviewing net exposures corresponding to updated capital markets data; and responsive to a determination that the exposure values corresponding to the existing risk mitigation portfolio are not within the desired range of the estimate of the sensitivities of the base valuation estimate, generate an updated risk mitigation portfolio by repeating the formulating and issuing steps.

2. The system of claim 1 wherein said computerized system further includes a display module, a data entry module, a processing module, a calculation module and one or more communication modules.

3. The system of claim 1 wherein said insurance instrument comprises an annuity contract.

4. The system of claim 1 and further comprising a reporting module for producing reports of information associated with said insurance instrument.

5. The system of claim 1, wherein the risk mitigation engine is further configured to formulate data specifying a risk mitigation instrument that is based on at least first derivative which exhibits a payoff formula is selected to provide greater risk mitigation when both the equity index decreases and the interest rate decreases relative to instances when only the equity index decreases and not the interest rate.

6. The system of claim 5 wherein the payoff formula is created using a put option instrument having a payoff amount based on a discount from a future date based on a reference interest rate.

7. The system of claim 1 wherein the insurance instrument includes a guaranteed minimum death benefit.

8. The system of claim 1 wherein the insurance instrument includes a guaranteed minimum income benefit.

9. The system of claim 1 wherein the insurance instrument includes a guaranteed minimum accumulation benefit.

10. The system of claim 1 wherein the insurance instrument includes a guaranteed minimum withdrawal benefit.

11. The system of claim 1 wherein the insurance instrument includes one or more of the following features: a product type, a death benefit, a withdrawal amount, a lapse period, a ratchet value, a fund selection, and a rollup value.

12. The system of claim 1 wherein the risk mitigation engine is further configured to perform risk mitigation transactions include active risk mitigation, wherein the active risk mitigation comprises:

matching at least one of the delta, gamma, vega, theta or rho to a portfolio of options contracts.

13. The system of claim 1 wherein the payoff formula is selected to provide lower risk mitigation costs when both the equity index decreases and the interest rate decreases relative to instances when only the equity index decreases.

14. The system of claim 1, wherein the hybrid derivative comprises a hybrid corridor index put option which has a payoff function $$\max(0, K-S_T)*L(r_T)$$

in which:

K is a strike price;

$S_T$ is a value of the underlying equity index at the maturity of the put option;

$r_T$ is the value of the 10 year par swap rate at the maturity of the put option; and $$L(x) = \begin{array}{ll} UU, & \text{if } r_T \geq UB \\ LU + (UU - LU) \cdot \dfrac{rT - LB}{UB - LB} & \text{if } LB < r_T < UB \\ LU, & \text{if } r_T \leq LB \end{array}$$

in which L(x) is between or equal to values UU and LU;

LB is a lower bound; and

UB is an upper bound.

15. A computerized method for directly mitigating risks assumed by an insurance provider corresponding to an insurance instrument with benefits issued by the insurance provider including formulating a data specifying a risk mitigation portfolio for directly mitigating the risks of the insurance provider that includes an instrument that is at least in part based on a hybrid derivative selected to embed equity and interest rate exposure simultaneously, the computerized method comprising:

identifying, in a risk mitigation system having at least one central processing computer and at least one data storage device, the at least one insurance instrument having benefits;

calculating in the at least one central processing computer at least one risk statistic based on characteristics of the at least one insurance instrument;

storing the at least one risk statistic in the at least one data storage device;

calculating a base valuation estimate corresponding to the at least one risk statistic associated with said issuance of said insurance instrument and an estimate of sensitivities of the base valuation estimate to changes in capital markets data;

formulating, based on the base valuation estimate and the estimate of the sensitivities of the base valuation estimate, by said risk mitigation system, the data specifying the risk mitigation portfolio for directly mitigating the risks associated with the at least one insurance instrument, wherein the risk mitigation portfolio includes the instrument that is at least in part based on the at least one hybrid derivative, and wherein the hybrid derivative exhibits a payoff formula that is a function of two or more asset classes, the hybrid derivative selected to embed equity and interest rate exposure simultaneously;

transmitting instructions which cause trades to be executed on behalf of the insurance provider based on the data specifying the risk mitigation portfolio that position the sensitivities of a valuation estimate of the risk mitigation portfolio within a desired range of the estimate of the sensitivities of the base valuation estimate;

determining whether exposure values corresponding to the risk mitigation portfolio are within a desired range of the estimate of the sensitivities of the base valuation estimate by continuously reviewing net exposures corresponding to updated capital markets data; and responsive to a determination that the exposure values corresponding to the existing risk mitigation portfolio are not within the desired range of the estimate of the sensitivities of the base valuation estimate, generating an updated risk mitigation portfolio by repeating the formulating and issuing steps.

16. The computerized method of claim 15, further comprising: using the data for mitigating the risks associated with the at least one insurance instrument to cause the purchasing of option contracts based on the data.

17. The computerized method of claim 15 wherein the insurance instrument includes at least one variable annuity contract.

18. The computerized method of claim 15 wherein the payoff formula is created using a put option instrument having a payoff amount based on a discount from a future date based on a reference interest rate.

19. The computerized method of claim 15 wherein the payoff formula is selected to provide greater risk mitigation protection when both an equity index decreases and an interest rate decreases relative to instances when only the equity index decreases and not the interest rate.

20. The computerized method of claim 15 wherein the payoff formula is selected to provide lower risk mitigation costs when both an equity index decreases and an interest rate decreases relative to instances when only the equity index decreases and not the interest rate.

21. The computerized method of claim 15, wherein the payoff formula is a function of:
   (a) any single or packaged combination of individual equities, equity indices, exchange-traded funds, equity futures, and/or equity forwards, and
   (b) any single interest rate, combination of interest rates, or observation(s) of joint behavior of one or more interest rates, or one or more indices linked to interest rates, or any single fixed income instrument or combination of fixed income instruments, or any single fixed income index or combination of fixed income indices, or any combination of any two or more of items listed in this paragraph (b).

22. A system for managing risks associated with a variable annuity contract issued by an insurance provider including formulating a data specifying a risk mitigation portfolio for directly mitigating the risks of the insurance provider that includes equity and interest rate hybrid derivatives which exhibit a payoff formula that is a joint function of an equity index and an interest rate, comprising:
   a data entry device configured to receive information related to the variable annuity contract;
   a communications device in communication with the data entry device;
   a data storage device in communication with the data entry device via the communications device storing the received information associated with the variable annuity contract;
   a processor in communication with said data storage device via the communications device, said computing system including a risk assessment module for assessing the risks associated with the issuance of said variable annuity contract, said risks including behavior risks and market risks; and
   a risk mitigation engine in communications with the processing device via communications device for directly mitigating the risks associated with said issuance of said variable annuity contract by utilizing hybrid derivatives, wherein the risk mitigation engine is configured to:
   calculate a base valuation estimate corresponding to the risks associated with said issuance of said insurance instrument and an estimate of sensitivities of the base valuation estimate to changes in capital markets data;
   formulate, based on the base valuation estimate and the estimate of the sensitivities of the base valuation estimate, the data specifying the risk mitigation portfolio that includes equity and interest rate hybrid derivatives which exhibit the payoff formula that is a joint function of the equity index and the interest rate wherein the payoff formula is selected to provide greater risk mitigation protection when both the equity index decreases and the interest rate decreases relative to instances when only the equity index decreases;
   issue one or more instructions for purchase of one or more options contracts based on the payoff formula;
   determine whether exposure values corresponding to the risk mitigation portfolio are within a desired range of the estimate of the sensitivities of the base valuation estimate by continuously reviewing net exposures corresponding to updated capital markets data; and
   responsive to a determination that the exposure values corresponding to the existing risk mitigation portfolio are not within the desired range of the estimate of the sensitivities of the base valuation estimate, generate an updated risk mitigation portfolio by repeating the formulating and issuing steps.

23. The system of claim 22 wherein the variable annuity contract includes a guaranteed minimum death benefit.

24. The system of claim 22 wherein the variable annuity contract includes a guaranteed minimum income benefit.

25. The system of claim 22 wherein the variable annuity contract includes a guaranteed minimum accumulation benefit.

26. The system of claim 22 wherein the variable annuity contract includes a guaranteed minimum withdrawal benefit.

27. A computerized method for identifying and mitigating risks associated with benefits corresponding to an insurance instrument comprising:
   identifying, by a central processing computer of a risk mitigation system in at least one data storage device of the risk mitigation system, data indicative of at least one insurance instrument having benefits;
   receiving, by a communication device of the risk mitigation system, capital markets data;
   calculating, by the at least one central processing computer, at least one risk statistic based on characteristics of the data indicative of the at least one insurance instrument;
   storing the at least one risk statistic in the at least one data storage device;
   providing, by the at least one central processing computer, the data indicative of the at least one insurance instrument having benefits and the capital markets data to a risk mitigation engine;
   calculating, by the risk mitigation engine, a base valuation estimate corresponding to the at least one risk statistic associated with said issuance of said insurance instrument and an estimate of sensitivities of the base valuation estimate to the capital markets data;
   comparing the base valuation estimate to an existing risk mitigation portfolio corresponding to the at least one insurance instrument having benefits;
   determining, based on the comparison, whether exposure values corresponding to the existing risk mitigation portfolio are within a desired range of the estimate of the sensitivities of the base valuation estimate;

responsive to a determination that the exposure values corresponding to the existing risk mitigation portfolio are not within the desired range of the estimate of the sensitivities of the base valuation estimate:
- formulating, by the risk mitigation engine, based on the base valuation estimate and the estimate of the sensitivities of the base valuation estimate, by said risk mitigation system, data specifying an updated risk mitigation portfolio for directly mitigating the risks associated with the at least one insurance instrument, wherein the updated risk mitigation portfolio includes the instrument that is at least in part based on the at least one hybrid derivative, and wherein the hybrid derivative exhibits a payoff formula that is a function of two or more asset classes, the hybrid derivative selected to embed equity and interest rate exposure simultaneously;
- transmitting, by the communication device, instructions which cause trades to be executed on behalf of the insurance provider based on the data specifying the updated risk mitigation portfolio that position the sensitivities of a valuation estimate of the risk mitigation portfolio within the desired range of the estimate of the sensitivities of the base valuation estimate; and
- determining whether exposure values corresponding to the existing risk mitigation portfolio are within a desired range of the estimate of the sensitivities of the base valuation estimate by continuously reviewing net exposures corresponding to updated capital markets data; and
- responsive to a determination that the exposure values corresponding to the existing risk mitigation portfolio are not within the desired range of the estimate of the sensitivities of the base valuation estimate, generating an updated risk mitigation portfolio by repeating the formulating and issuing steps; and
- responsive to a determination that the exposure values corresponding to the existing risk mitigation portfolio are within the desired range of the estimate of the sensitivities of the base valuation estimate, determining whether exposure values corresponding to the existing risk mitigation portfolio are within the desired range of the estimate of the sensitivities of the base valuation estimate by continuously reviewing net exposures corresponding to updated capital markets data, and responsive to a determination that the exposure values corresponding to the existing risk mitigation portfolio are not within the desired range of the estimate of the sensitivities of the base valuation estimate, generating an updated risk mitigation portfolio by repeating the formulating and issuing steps.

* * * * *